June 9, 1925.  1,541,298
W. H. VE RELLE
ANIMAL TRAP
Filed Jan. 14, 1924   3 Sheets-Sheet 1
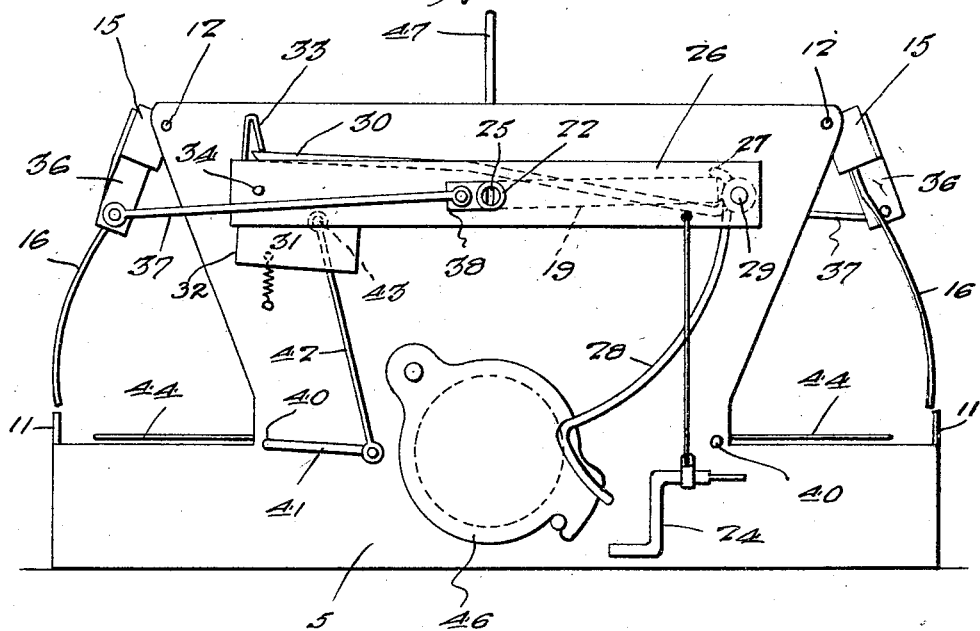
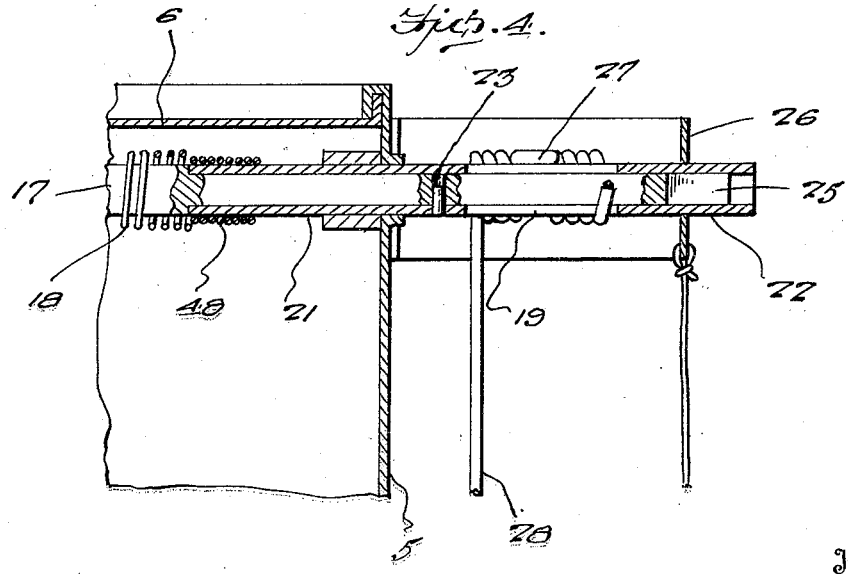
Inventor
W. H. VeRelle June 9, 1925.
W. H. VE RELLE
ANIMAL TRAP
Filed Jan. 14, 1924
1,541,298
3 Sheets-Sheet 2
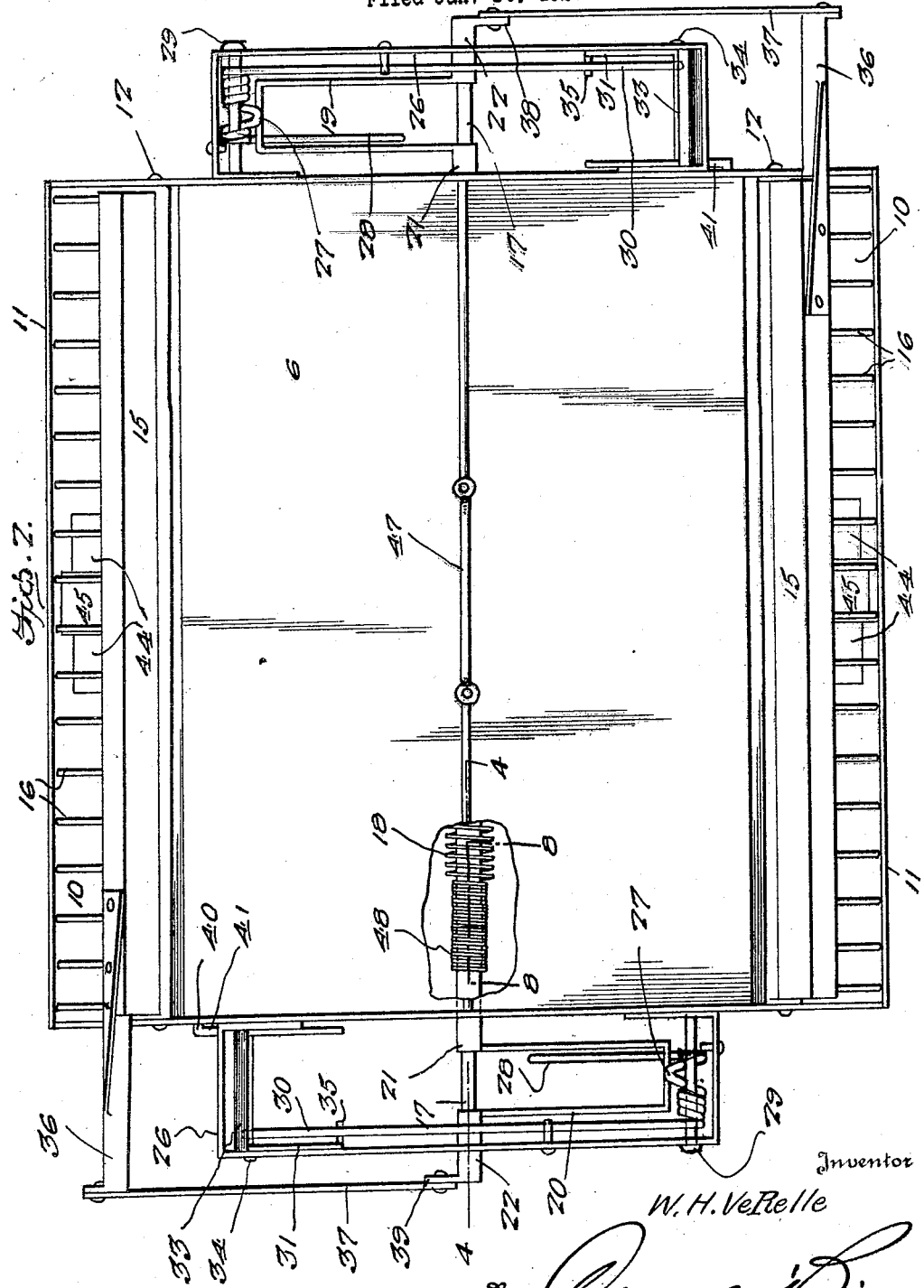
Inventor
W. H. VeRelle June 9, 1925. 1,541,298
W. H. VE RELLE
ANIMAL TRAP
Filed Jan. 14, 1924 3 Sheets-Sheet 3
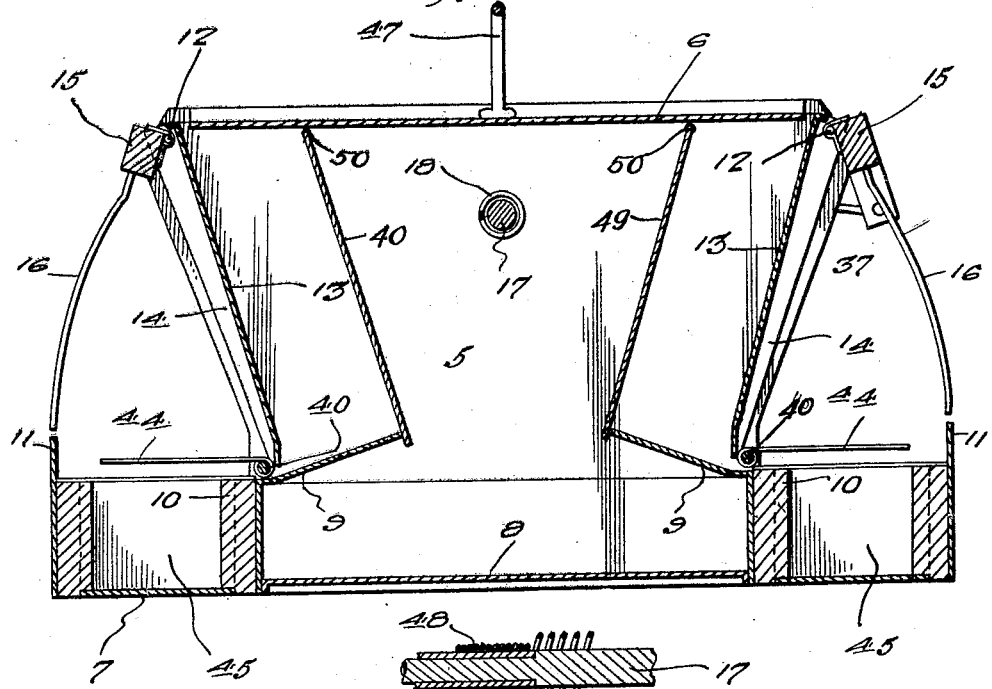
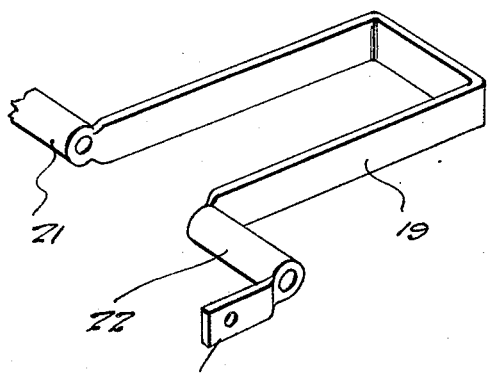
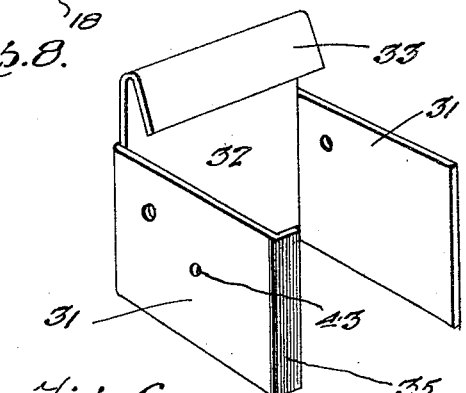
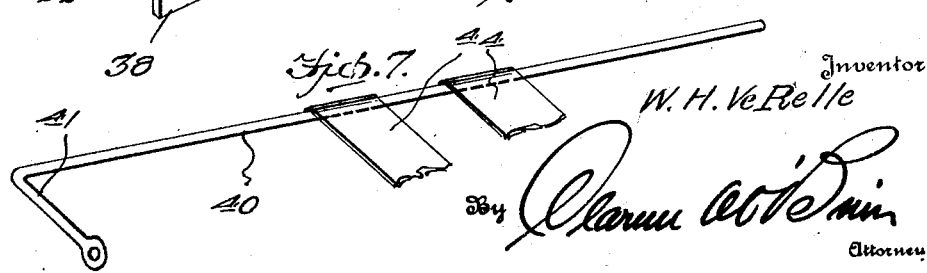
Inventor
W. H. Ve Relle Patented June 9, 1925.

1,541,298

UNITED STATES PATENT OFFICE.

WILLIAM H. VE RELLE, OF NEWARK, NEW JERSEY, ASSIGNOR TO HENRY J. KLUSMIRE, OF HOLTON, KANSAS.

ANIMAL TRAP.

Application filed January 14, 1924. Serial No. 686,118.

*To all whom it may concern:*

Be it known that I, WILLIAM H. VE RELLE, citizen of the United States, residing at Newark, in the county of Essex and State of New Jersey, have invented certain new and useful Improvements in Animal Traps, of which the following is a specification.

This invention relates to animal traps, and has for its primary object to improve generally the construction of the trap shown in U. S. Letters Patent #1,024,875, granted April 30, 1912, to Washington I. Wolverton. In that trap, the animals are caught alive, and trapping mechanism is only provided for one side of the casing, but in the present form of trap, to be presently described, the animals may be destroyed as they are trapped, and trapping mechanism is provided for both sides of the casing in a novel manner whereby both trapping mechanism are under the actuating influence of one and the same spring.

The present invention therefore not only has as its aim to improve upon the former trap in the matter of details of construction, but also to increase the efficiency of the former trap by making provision for destroying the animals as they are trapped, and for trapping the animals at both sides of the trap casing by two separate trapping mechanisms having the same actuating spring, thus at least doubling the efficiency of the former trap at a cost much less than twice the cost of the latter and in a manner more effective and desirable than that of employing two of the former traps.

Other objects will become apparent as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is an end elevational view of the trap.

Figure 2 is a top plan view thereof, partly broken away.

Figure 3 is a substantially central transverse sectional view of the same.

Figure 4 is an enlarged fragmentary longitudinal sectional view, taken substantially on the line 4—4 of Figure 2.

Figure 5 is an enlarged perspective view of one of the bails.

Figure 6 is a view, similar to Figure 5, of one of the detents.

Figure 7 is a perspective view of one of the trigger plate-carrying shafts, and

Figure 8 is an enlarged fragmentary sectional view, taken substantially on the line 8—8 of Figure 2.

In the drawings, the casing or body of the trap is illustrated as embodying ends 5, a top 6, and a bottom which consists of a fixed section 7, the major central portion of which is cut away or removed to provide a large opening in which is removably fitted a water pan section 8, the upper edges of the walls of which are formed with inturned inclined flanges 9. The pan 8 is removable for the purpose of removing the destroyed or drowned trapped animals.

At each side of the trap is a runway that includes a floor 10, and a plate 11, the upper edge portion of which projects upwardly above the floor of the runway. The pan 8 fits between the runway floors 10 and the flanges 9 thereof are preferably extended upwardly from the upper surfaces of said runway floors, as shown.

Shafts 12 are fixed at their ends in the upper corners of the ends of the body of the trap, at each side of the trap, and doors 13 are formed at their side edges with flanges 14 which are pivoted upon the shafts 12. The lower edges of the doors 13 rest by gravity against the shafts 40, each door being hingedly supported from one end of the shafts 12. A bar 15 is also pivoted upon each shaft 12 and carries fingers 16 which are preferably of outwardly curved form and project downwardly and outwardly when the bar is in normal position. The lower ends of these fingers 16 terminate immediately above the upper edges of the plates 11 and they each form one wall of one of the runways, of which the doors 13 form the other walls, the door and fingers of each runway being in synclinal planes.

A shaft 17 is journalled in the ends of the body of the trap, and upon this shaft is mounted a spring 18, which, at one end, is secured to a bail 19, which is fixed upon one projecting end of said shaft, and at its other end is secured to a bail 20 which is rotatably mounted upon the other projecting end of the shaft. The bails 19 and 20 have rigid laterally extending tubular end members 21 and 22 fitted onto the reduced ends of the shaft 17, and the inner member 21 of bail 19 is secured to the shaft by a cross pin 23 or the like, the outer member 22 of bail 19 projecting outwardly slightly beyond the adjacent end of shaft 17 for reception of a crank key 24 suspended from the cord or other flexible element (see Figures 1 and 4), and the said end of shaft 17 having a longitudinal slot 25 for reception of the bit of the key, whereby the latter may be turned for rotating the shaft and winding the spring, as will presently become apparent.

A bracket 26 is secured upon each end of the body of the trap, and the outer end members 22 of the bails 19 and 20 are journalled in these brackets. The bail 19 is fixed upon the shaft 17 within one of the brackets 26, while the bail 20 is journalled upon the shaft 17 within the other bracket. Each bail engages, when the trap is set, with a finger 27, which constitutes an extension of a brake arm 28 mounted to rock upon a short rod 29 fixed in the adjacent bracket 26. Each arm 28 also has a finger 30 extending therefrom.

For each finger 30, above-mentioned, there is provided a detent which is clearly shown in the above mentioned patent, and in Figure 6 of the present drawings, and which is formed from a blank bent to form sides 31 and a connecting portion 32 which projects above the sides and has its upper portion bent over inwardly as at 33. A pin 34 is fixed in each bracket and the adjacent end of the body of the trap and each detent is pivotally mounted upon one of these pins in such manner that the sides thereof will normally assume the position shown in Figure 1. One of the sides 31 is formed with an inturned flange 35, the purpose of which is disclosed in the above mentioned patent. The fingers 30 engage the overturned portions of the detents, and this serves to hold the shaft 17 and its attached bail 19 and the bail 20 against rotation, through the medium of the fingers 27. As the bails are reversely positioned and connected to opposite ends of the spring 18, it will be readily understood that when the detent at either end of the trap is rocked so as to disengage the portion 33 thereof from the adjacent finger 30, the adjacent bail 19 or 20 will be released, thereby allowing the same to be rotated by unwinding of the spring 18, the detent at the other end of the trap remaining latched for preventing rotation of the other bail so that one end of the spring is held against unwinding. However, it will be seen that both detents may be released at once for simultaneously releasing both bails whereby they may be reversely rotated at the same time by the spring 18. While the first parts of the cycles of revolution of the bails are rapid, the latter parts are retarded by the riding of the bails over the brake arms 28. This insures proper re-engagement of the bails with their fingers 27. An arm 36 is secured to and projects laterally from each bar 15 at one end thereof, and a rod 37 is pivoted to the end of each arm 36, the other end of one of the rods 37 being pivoted to an arm 38 rigid with the outer member 22 of the bail 19, and the other end of the remaining rod 37 being pivoted to an arm 39 rigid with the outer member 22 of the bail 20. It will now be understood that when the shaft 17 and bail 19 rotate the fingers 16 at one side of the trap will be quickly swung inwardly, while, when the bail 20 rotates, the fingers 16 at the other side of the trap will be quickly swung inwardly.

A shaft 40 is journalled in the ends of the body of the trap immediately above and at the inner edge of each of the runway floors 10, and one end of each shaft 40 is provided with a crank arm 41 to which is pivoted the lower end of a rod 42. The upper end of each rod 42 is pivoted to one of the detents as at 43. Each shaft 40 carries two trigger plates 44 which straddle a bait holding recess 45 provided in the floor of the adjacent runway.

It will now be readily understood that when an animal enters either runway and treads upon the trigger plates thereof, the adjacent shaft 40 is rocked, thereby releasing the detent that is connected to the latter, from the associated finger 30. This results in a release of the associated bail 19 or 20 and in a rotation of the latter, whereupon this particular bail causes the fingers connected therewith to rake or sweep inwardly toward the adjacent door 13 to swiftly force the animal into the interior of the trap. When the pan 8 is filled with water or poison, the animals will fall into the same and be drowned or destroyed. To guard against loss of the key 24, the same may be suspended from the frame 26 at the spring winding end of the trap by a flexible element or cord 45, and the interior of the trap may be inspected through an opening provided in one of the end walls 5, which opening is shown as closed by a swinging closure plate 46. Suitable means may be provided for retaining the pan 8 in place, while the trap may be carried about by a handle 47 centrally secured to the top wall 6.

As shown in Figures 2, 4, and 8, the ends of the spring 18 may be secured to the inner ends of the inner members 21 of the bails 19 and 20 by tightly and closely winding the spring ends about the members 21 as indicated at 48.

Further doors 49 are hinged to the walls 5 as at 50 inwardly of the doors 13, and the lower ends of the doors 49 rest by gravity against the flanges 9 of the pan 8. These doors 49 positively direct the animals into the pan 8 and prevent them from escaping from said pan in an obvious manner.

This trap has particular reference to a mouse and rat trap.

What I claim as new is:

1. In a trap, a compartment, swinging doors normally closing the sides of the same, runways outwardly of the doors, bars mounted above the runways, sweep fingers projecting from the bars, a shaft having a bail fixed on one end and a second bail journaled on the other end, a single impelling spring for rotating the shaft and its attached bail in one direction and for rotating the second bail in an opposite direction, a connection between each bail and one of said bars, separate means for normally holding the bails against rotation, a trigger plate arranged in each runway, and a connection between each trigger plate and one of said holding means for releasing the latter when the associated trigger plate is depressed.

2. In a trap, a compartment, swinging doors normally closing the sides of the same, runways outwardly of the doors, bars mounted above the runways, sweep fingers projecting from the bars, a shaft having a bail fixed on one end and a second bail journalled on the other end, a single impelling spring for rotating the shaft and its attached bail in one direction and for rotating the second bail in an opposite direction, a connection between each bail and one of said bars, separate means for normally holding the bails against rotation, a trigger plate arranged in each runway, and a connection between each trigger plate and one of said holding means for releasing the latter when the associated trigger plate is depressed, said compartment embodying a removable pan positioned between the runways.

3. In a trap, a compartment, swinging doors normally closing the sides of the same, runways outwardly of the doors, bars mounted above the runways, sweep fingers projecting from the bars, a pair of relatively rotatable bails arranged at opposite ends of the compartment, a single impelling spring for rotating the bails in opposite directions, a connection between each bail and one of said bars, separate means for normally holding the bails against rotation, a trigger plate arranged in each runway, and a connection between each trigger plate and one of said holding means for releasing the latter when the associated trigger plate is depressed.

4. In a trap, a compartment, swinging doors normally closing the sides of the same, runways outwardly of the doors, bars mounted above the runways, sweep fingers projecting from the bars, a shaft having a bail fixed on one end and a second bail journalled on the other end, a single impelling spring for rotating the shaft and its attached bail in one direction and for rotating the second bail in an opposite direction, a connection between each bail and one of said bars, separate means for normally holding the bails against rotation, a trigger plate arranged in each runway, a connection between each trigger plate and one of said holding means for releasing the latter when the associated trigger plate is depressed, said compartment embodying a removable pan positioned between the runways, and having inwardly projecting flanges, and further swinging doors disposed inwardly of the first named doors.

In testimony whereof I affix my signature.

WILLIAM H. VE RELLE.